(12) United States Patent
Schalja

(10) Patent No.: US 12,328,038 B2
(45) Date of Patent: Jun. 10, 2025

(54) CONCEPT OF A DRIVE FOR ACTUATION IN THE DRIVE TRAIN

(71) Applicant: Vitesco Technologies Germany GmbH, Regensburg (DE)

(72) Inventor: Alexander Schalja, Munich (DE)

(73) Assignee: Vitesco Technologies Germany GmbH, Regensburg (DE)

( * ) Notice: Subject to any disclaimer, the term of this patent is extended or adjusted under 35 U.S.C. 154(b) by 304 days.

(21) Appl. No.: 18/011,275

(22) PCT Filed: Jun. 17, 2021

(86) PCT No.: PCT/EP2021/066330
§ 371 (c)(1),
(2) Date: Dec. 19, 2022

(87) PCT Pub. No.: WO2021/255134
PCT Pub. Date: Dec. 23, 2021

(65) Prior Publication Data
US 2023/0231445 A1    Jul. 20, 2023

(30) Foreign Application Priority Data
Jun. 19, 2020 (DE) ..................... 10 2020 207 640.5

(51) Int. Cl.
*H02K 11/00* (2016.01)
*H02K 5/10* (2006.01)
(Continued)

(52) U.S. Cl.
CPC ............. *H02K 11/215* (2016.01); *H02K 5/10* (2013.01); *H02K 7/003* (2013.01); *H02K 7/006* (2013.01);
(Continued)

(58) Field of Classification Search
CPC ........ H02K 11/215; H02K 5/10; H02K 7/003; H02K 7/006; H02K 7/083; H02K 7/116; H02K 11/33; H02K 2211/03
See application file for complete search history.

(56) References Cited

U.S. PATENT DOCUMENTS 5,403,249 A    4/1995   Slicker
9,879,596 B1   1/2018   Bogen et al.
(Continued)

FOREIGN PATENT DOCUMENTS

DE       69408520 T2    9/1998
DE     102018109294 A1   10/2018
(Continued)

*Primary Examiner* — Thomas Truong
(74) *Attorney, Agent, or Firm* — Laurence A. Greenberg; Werner H. Stemer; Ralph E. Locher

(57) ABSTRACT

A structural concept of a drive for an actuation device in a drive train of a motor vehicle, contains an electric motor with a motor housing shell, a circuit carrier with a control unit for controlling the electric motor, and an output shaft of a gearbox with a gearbox housing shell. The rotor shaft of the electric motor is arranged axially with respect to the output shaft of the gearbox, and the rotor shaft of the electric motor is accommodated in the output shaft in a rotatably mounted manner in the region of the gearbox housing shell. The circuit carrier is arranged between the electric motor and the output shaft of the gearbox, and the rotor shaft leads through a cutout in the circuit carrier.

9 Claims, 3 Drawing Sheets

(51) Int. Cl.
    *H02K 7/00*     (2006.01)
    *H02K 7/08*     (2006.01)
    *H02K 7/116*    (2006.01)
    *H02K 11/215*   (2016.01)
    *H02K 11/33*    (2016.01)
    *H05K 5/10*     (2025.01)

(52) U.S. Cl.
    CPC .............. *H02K 7/083* (2013.01); *H02K 7/116* (2013.01); *H02K 11/33* (2016.01); *H02K 2211/03* (2013.01)

(56) References Cited

U.S. PATENT DOCUMENTS

| | | | |
|---|---|---|---|
| 10,004,142 B1* | 6/2018 | Wightman | H05K 3/368 |
| 2006/0287149 A1* | 12/2006 | Mao | H02K 1/146 |
| | | | 475/5 |
| 2017/0373555 A1 | 12/2017 | Sigg et al. | |
| 2018/0062479 A1 | 3/2018 | Stewart et al. | |
| 2018/0227204 A1 | 8/2018 | Magielse, Sr. et al. | |
| 2018/0283524 A1* | 10/2018 | Uematsu | H02K 5/10 |
| 2019/0097495 A1 | 3/2019 | Dion et al. | |
| 2019/0326842 A1 | 10/2019 | Omekanda et al. | |
| 2020/0251956 A1* | 8/2020 | Kinjo | H02K 7/04 |

FOREIGN PATENT DOCUMENTS

| | | | |
|---|---|---|---|
| JP | 2012528564 A | 11/2012 | |
| JP | 2018528668 A | 9/2018 | |
| JP | 2019103328 A | 6/2019 | |

\* cited by examiner

CONCEPT OF A DRIVE FOR ACTUATION IN THE DRIVE TRAIN

FIELD AND BACKGROUND OF THE INVENTION

The invention relates to a structural concept of a drive for an actuation means in the drive train of a motor vehicle according to the preamble of the independent claim.

The non-smart solutions known on the free market for a structural concept of a drive for an actuation means in the drive train generally have the following components:
   electric motor (DC, BLDC, SR=switched reluctance) for a torque in the range of approx. 0.2 to 0.7 Nm,
   a reduction gear (worm or eccentric gear),
   a rotor position sensor (for BLDC or SR motor types), typically realized as a switched Hall sensor array.

"Smart drives", usually based on a DC motor, typically have an integrated sensor for detecting the angle of the output shaft, usually realized as a linear Hall sensor with a magnetic target, but no rotor position sensor, since in particular a DC motor does not in principle require a rotor position sensor for operation.

The following requirements are imposed on such drives:
   output torque in the range up to 25 Nm,
   output angle range of approx. 20 to 120°,
   self-locking or no self-locking, depending on the configuration of the mechanical section to be moved,
   safety-relevant availability of position information of the output shaft,
   fulfillment of a positioning accuracy related to the angular position of the output shaft.

"Non-smart" drives must be operated or regulated externally. For this purpose, an additional control unit, in particular a stand-alone control unit, is required. Furthermore, an electrical connection, for example a wiring harness, is required for the three-phase power supply of the motor.

The rotor position sensor must be provided with a supply and read out. This requires an additional four to five conductors in the same wiring harness. In the case of "non-smart" drives, the angle detection of the output shaft requires an additional component, in particular a sensor or a switch, as well as a further additional wiring harness and a connector for providing a supply to the sensor for angle detection of the output shaft and for signal transmission from the sensor.

DC motor-based solutions are favorable, but self-locking, and are also limited in meeting safety requirements, in particular ASIL C, due to the DC motor itself (potential short circuit to ground and thus unintentional movement of the actuator), and only one angle sensor is required, instead of two.

BLDC- or SR-motor-based solutions entail disadvantages with respect to the integration and arrangement of the rotor position and output shaft angle sensors, since the two sensors are typically mounted on opposite sides of the arrangement. This is due, inter alia, to the gearbox construction which prevents sensing close to the axis of rotation, which requires an integration of a "sensor dome" outside the printed circuit board plane of the control unit and entails a cost disadvantage.

In the case of "smart" BLDC- or SR-motor-based arrangements, a typical actuator design in a classic arrangement of the components ECU (Electronic Control Unit)—motor gear stages leads to a type of mushroom head on one end face of the stator, typically due to a larger required radial installation space for the circuit carrier compared to the diameter of the stator, and thus leads to disadvantages, in particular with respect to the radial installation space. That is, conventionally, the circuit carrier (=PCB) of the ECU, which is realized as a printed circuit board, is arranged axially on the end face of the motor, and the projection of the surface of the PCB is typically larger than the motor diameter.

This adversely affects, in particular, the neighboring components in the given installation space of the customer, for example in the vicinity of the gearbox or traction machine, or adversely affects the given courses of the hoses, pipes, wiring harnesses, exhaust system, etc., which are also required, and thus possibly leads to an increased change effort in the event of integration for the customer.

In the usual arrangement of PCB and electric motor, the following use is made of a rotor position sensor system (RPS):
   sensor magnet with a height of approx. 5 mm—air gap to the sensor IC of the order of magnitude of approx. 2-3 mm—sensor IC with a height of approx. 2.5 mm. This arrangement thus has a very disadvantageous effect on the axial structural height of the actuator concept.

In the case of actuators based on BLDC or SR motors, the rotor shaft is typically mounted on both sides with ball bearings (A and B sides). The output or the connection of a pinion or toothed wheel takes place at the shaft tip (C side), on the side facing away from the PCB. This also contributes negatively to the overall structural length of the concept.

In addition, this classic approach of the actuator concept leads to the necessity of a cover for covering the printed circuit board as a further housing component and, in particular, of an additional, separate environmental seal in the cover of the arrangement. The conventional structural concept of ECU-motor-gearbox thus requires a relatively large installation space, in particular in axial extension, and a relatively large number of individual parts, which in turn have to be sealed off from one another by additional separate seals.

SUMMARY OF THE INVENTION

It is therefore the object of the present invention to provide a structural concept of an intelligent drive for an actuation means in the drive train of a motor vehicle which represents an improvement over the prior art with respect to the installation space required, the number of components and with respect to the production costs.

This object is achieved according to the invention by a structural concept having the features of the independent claim.

A structural concept according to the invention comprises an electric motor with a motor housing shell, a circuit carrier with a control unit for controlling the electric motor, an output shaft of a gearbox with a gearbox housing shell, the rotor shaft of the electric motor being arranged axially with respect to the output shaft of the gearbox, and the rotor shaft of the electric motor being accommodated in the output shaft in a rotatably mounted manner in the region of the gearbox housing shell, the circuit carrier being arranged between the electric motor and the output shaft of the gearbox, and the rotor shaft leading through a cutout in the circuit carrier.

The fact that the circuit carrier is arranged between the electric motor and the output shaft of the gearbox results in advantages, in particular with respect to the installation space required and furthermore with respect to the material and production costs of the structural concept.

In one embodiment, the circuit carrier is equipped with electronic components on both sides, a first sensor for detecting the rotor position being arranged outside the cutout on the side of the circuit carrier facing the electric motor, and a second sensor for detecting the angle of the output shaft being arranged outside the cutout on the side of the circuit carrier facing the output shaft. This results in a smaller extension of the structural concept in the axial direction.

In one embodiment, the first sensor is realized as a magnetoresistive sensor or as a switched Hall sensor array.

In a further embodiment, the second sensor is realized as a linear Hall sensor, as a single-switched Hall sensor or as a switched Hall sensor array.

In one embodiment, furthermore, a seal is arranged between the motor housing shell and the gearbox housing shell, the seal being realized as a liquid seal or as a solid seal. Alternatively, the seal can be injection-molded onto one of the two housing shells.

In particular, in one embodiment, the radial extension of the motor housing shell corresponds substantially to the radial extension of the electric motor. This contributes to the compactness of the arrangement.

In a further embodiment, the total axial extension of the structural concept corresponds substantially to the sum of the axial extension of the motor housing shell and the axial extension of the gearbox housing shell. This also contributes to the compactness of the arrangement.

In one embodiment, the actuation means is configured as a parking lock, as an automatic transmission selector switch, as a gear selector or as a clutch actuator in a motor vehicle.

In one embodiment, furthermore, the rotor shaft is mounted rotatably in the output shaft, it being possible for the bearing in the output shaft to be realized as a sliding bearing or rolling body bearing.

The features and details of the invention are explained in greater detail in the following description in conjunction with the accompanying drawings with reference to exemplary embodiments. In this case, features and relationships described in individual variants can in principle be applied to all exemplary embodiments. In the drawings:

DETAILED DESCRIPTION OF THE INVENTION

Figure 1:
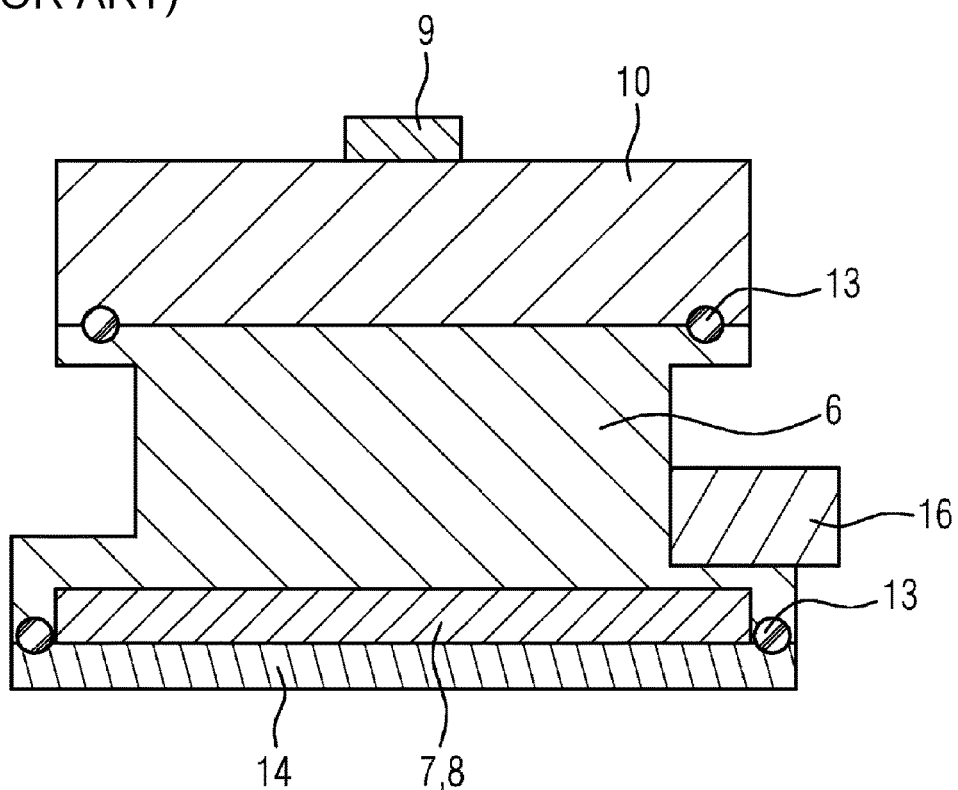
FIG. 1 shows a schematic representation of a structural concept from the prior art.

FIG. 1 shows a schematic representation of a structural concept from the prior art. A motor housing shell 6, which accommodates the electric motor 2, and a gearbox housing shell 10, which substantially accommodates the output shaft 9, form the essential components of the housing of the structural concept. A seal 13 is arranged between the motor housing shell 6 and the gearbox housing shell 10. A circuit carrier 7, in particular in the form of a printed circuit board or PCB, on which a control unit 8, also referred to as an ECU, for controlling the electric motor 2 is arranged, is arranged frontally on the side of the motor housing shell 6 facing away from the output shaft 9, and is sealed off from the space outside the housing by means of a further seal 13 between the motor housing shell 6 and a cover 14.

By virtue of the fact that the projection of the surface of the printed circuit board is generally larger than the diameter of the electric motor 2, this structural concept 1 from the prior art has in particular the disadvantage with respect to the installation space in the radial direction, since here the radial extension of the motor housing shell 6 is necessarily larger than the radial extension of the electric motor 2. As a result, the motor housing shell 6 assumes the shape of a mushroom head.

Figure 2:
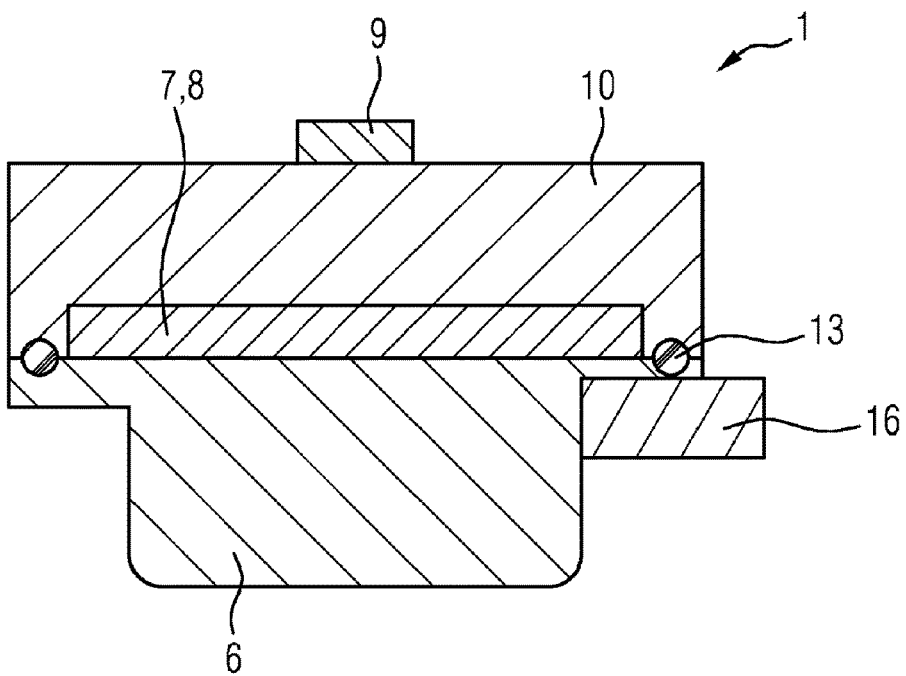
FIG. 2 shows a schematic representation of a structural concept according to the invention.

FIG. 2 shows a schematic representation of the structural concept according to the invention. The circuit carrier 7 with a control unit 8 for controlling the electric motor 2 is arranged here between the electric motor 2 in the motor housing shell 6 and the output shaft 9 of the gearbox in the gearbox housing shell 10. The installation space of the motor housing shell 6 in the radial direction is thus smaller than in the prior art, since the radial extension of the motor housing shell 6 now corresponds substantially to the radial extension of the electric motor 2. A further advantage of this structural concept 1 is that only a single seal 13 is required here, specifically between the motor housing shell 6 and the gearbox housing shell 10, since the motor housing shell 6 does not require a cover 14.

In FIG. 1 and in FIG. 2, for example, the output shaft 9 projects out of the gearbox housing shell 10.

Figure 3:
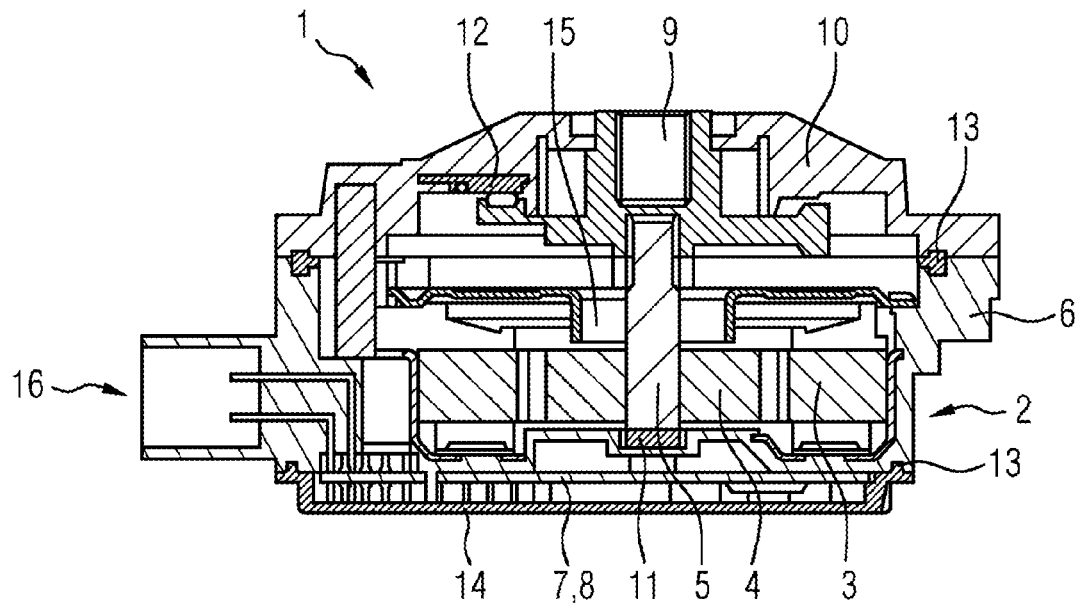
FIG. 3 shows a section through a structural concept from the prior art.

FIG. 3 shows a section through a structural concept 1 from the prior art. An electric motor 2 is arranged in a motor housing shell 6. The electric motor 2 comprises a stator 3 and a rotor 4 with a rotor shaft 5. An output shaft 9 of a gearbox is arranged in a gearbox housing shell 10. In this case, the rotor shaft 5 of the electric motor 2 is aligned axially with respect to the output shaft 9 of the gearbox. Furthermore, the rotor shaft 5 of the electric motor 2 is accommodated in the output shaft 9 in a rotatably mounted manner in the region of the gearbox housing shell 10.

A circuit carrier 7 or printed circuit board or also PCB is arranged frontally on the side of the motor housing shell 6 facing away from the output shaft 9 and is sealed off from the space outside the housing by means of a further seal 13 between the motor housing shell 6 and a cover 14.

A rotor position sensor system (RPS) is configured here axially as a continuation of the rotor shaft 5. The sensor magnet is connected to the corresponding end face of the rotor shaft 5 and is generally about 5 mm high. The sensor 11 itself is arranged on the printed circuit board and is generally about 2.5 mm high. The air gap between the sensor magnet and the sensor 11 is generally of the order of magnitude of approximately 2-3 mm. This arrangement of the rotor position sensor system contributes to the axial structural length of the structural concept. A further contribution to the axial structural length is made by the cover for closing and sealing the motor housing shell 6 in the region of the circuit carrier 7.

Figure 4:
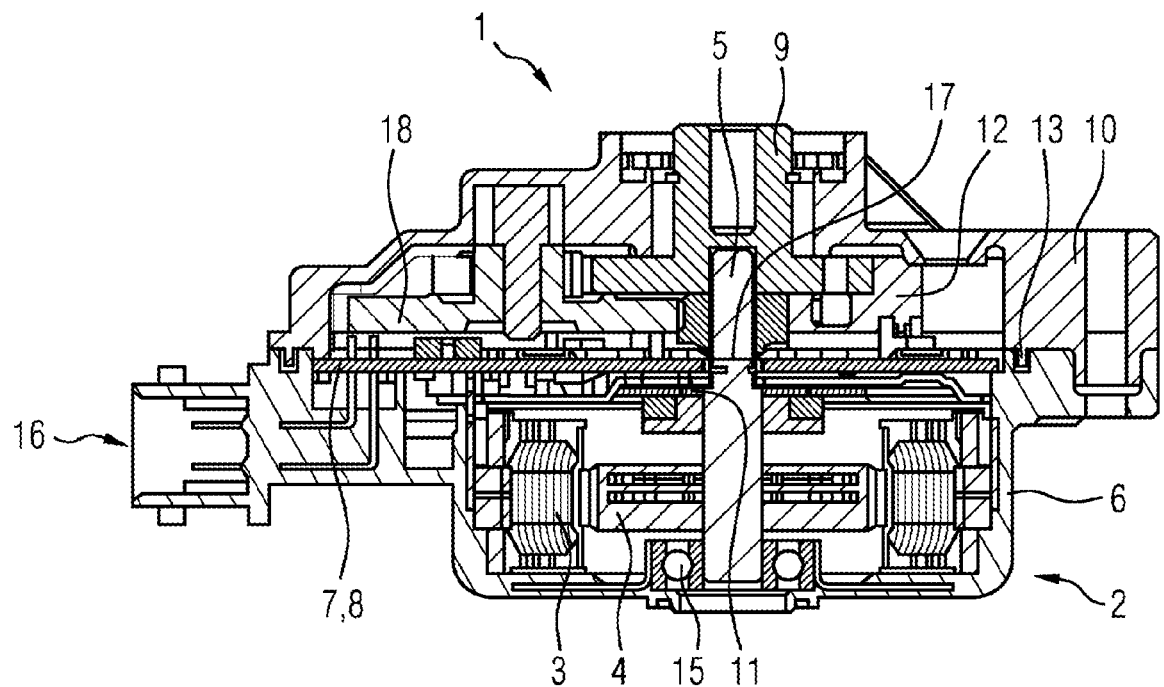
FIG. 4 shows a section through a structural concept according to the invention

FIG. 4 shows a section through the structural concept according to the invention. The essential difference between this structural concept and the structural concept 1 from FIG. 3 from the prior art is, as already explained in the discussion of the schematic representations of FIG. 2 and FIG. 1, in which FIG. 1 shows prior art, that the circuit carrier 7 in FIG. 4 is arranged between the electric motor 2 and the output shaft 9 of the gearbox. In FIG. 4, the circuit carrier 7 is located in the motor housing shell 6 in the edge region towards the gearbox housing shell 10, but it would also be possible to accommodate the circuit carrier 7 in the gearbox housing shell 10, in particular in the edge region towards the motor housing shell 6. The rotor shaft 5 of the electric motor 2 is arranged axially with respect to the output shaft 9 of the gearbox, and here it is accommodated in the output shaft 9 in a rotatably mounted manner in the region of the gearbox housing shell 10. In this structural concept 1 in FIG. 4, the rotor shaft 5 is guided for this purpose through a corresponding cutout 17 in the circuit carrier 7 into the gearbox housing shell 10 to the output shaft 9. At least one toothed wheel 18 of the gearbox is also arranged in the gearbox housing shell 10.

The circuit carrier 7, with a control unit 8 for controlling the electric motor 2, is equipped on both sides with electronic components.

In this case, a first sensor 11 for detecting the rotor position is arranged outside the cutout 17, and thus "off-axis" with respect to the rotor shaft 5, that is outside the rotor shaft 5, on the side of the circuit carrier 7 facing the electric motor 2. The first sensor 11 is realized, for example, as an MR sensor or magnetoresistive sensor, but can also be realized as a switched Hall sensor array, with typically three Hall switching elements. A corresponding encoder is connected to the rotor shaft 5 in a rotationally fixed manner correspondingly "off-axis".

A second sensor 12 for detecting the angle of the output shaft 9 is arranged outside the cutout 17 on the side of the circuit carrier 7 facing the output shaft 9. The second sensor 12 can be realized, for example, as a linear Hall sensor, as a single-switched Hall sensor or as a switched Hall sensor array. A corresponding encoder is connected to the output shaft in a rotationally fixed manner.

Figure 5:
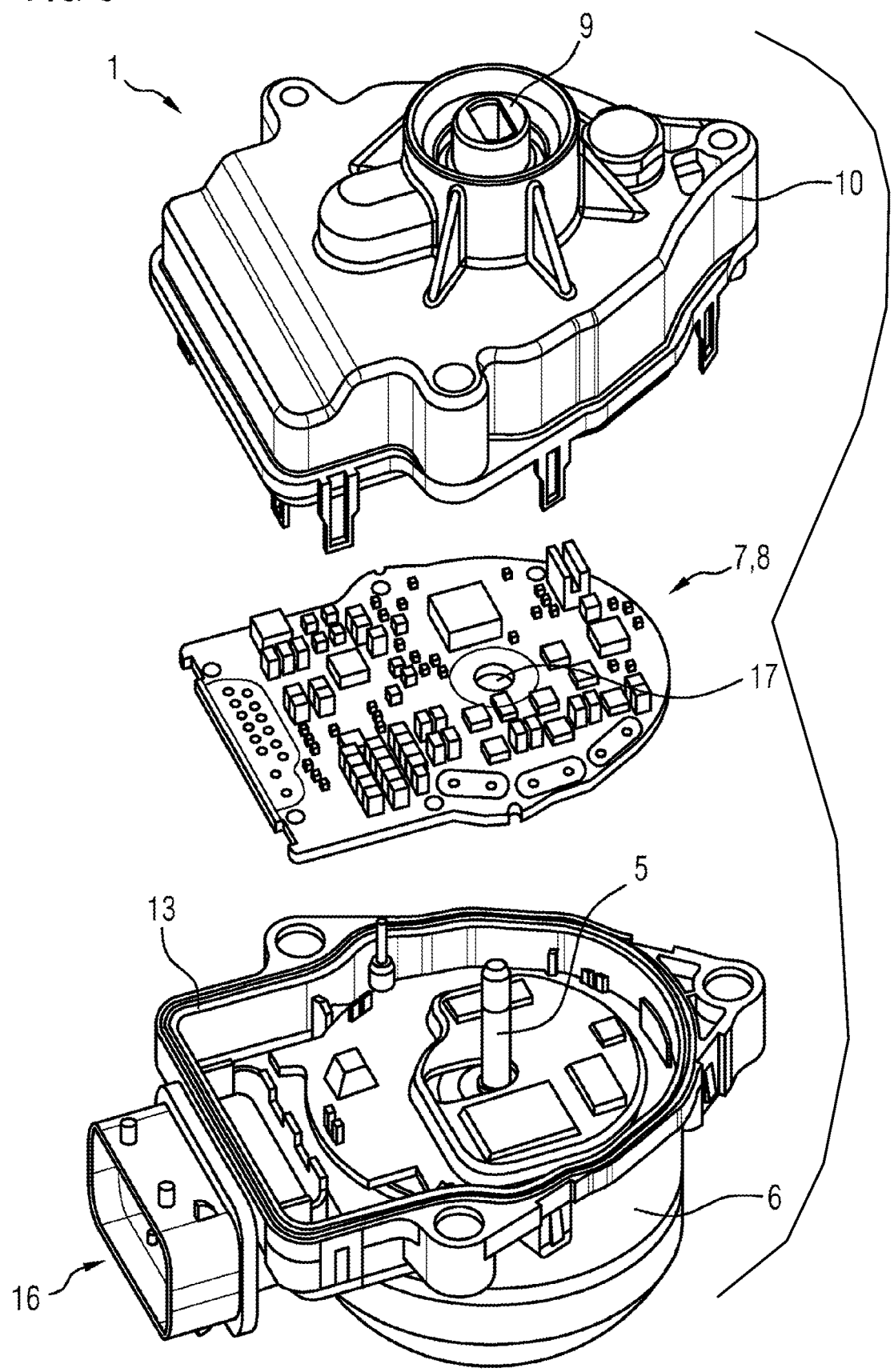
FIG. 5 shows an exploded view of the structural concept.

FIG. 5 shows an exploded view of the structural concept.

By virtue of the fact that the circuit carrier 7 in FIG. 4 and FIG. 5 is arranged between the electric motor 2 and the output shaft 9 of the gearbox, the radial extension of the motor housing shell 6 here corresponds substantially to the radial extension of the electric motor 2.

By virtue of the fact that the first sensor 11 for detecting the rotor position is arranged not like in the prior art axially as a continuation of the rotor shaft 5 on the end face thereof but "off-axis" outside the cutout 17 in the printed circuit board and thus outside the rotor shaft 5, and by virtue of the fact that the cover 14 can be omitted, the entire axial extension of the structural concept corresponds substantially to the sum of the axial extensions of the motor housing shell 6 and the axial extension of the gearbox housing shell 10.

A further significant advantage of the structural concept 1 according to the invention over the structural concept 1 according to the prior art relates to the lower material costs and the production costs, since in particular the second seal 13 between the cover 14 and the motor housing shell 6 and also the cover 14 itself, and the production steps associated therewith, can be dispensed with.

Furthermore, both sensors 11, 12 can be assembled as SMD components in the ReFlow process when equipping the printed circuit board 7, that is no sensor domes are required for sensing the rotating components.

In particular, a connector 16 is arranged here on the motor housing shell 6, in particular for transmitting signals.

LIST OF REFERENCES DESIGNATIONS

1 Structural concept,
2 Electric motor,
3 Stator,
4 Rotor,
5 Rotor shaft,
6 Motor housing shell,
7 Circuit carrier,
8 Control unit, electronic components
9 Output shaft of a gearbox,
10 Gearbox housing shell,
11 First sensor,
12 Second sensor,
13 Seal,
14 Cover,
15 Bearing,
16 Connector,
17 Cutout in the circuit carrier,
18 Toothed wheel in the gearbox housing shell

The invention claimed is:

1. A structural concept of a drive for an actuator in a drive train of a motor vehicle, the structural concept comprising:
   an electric motor with a motor housing shell and a rotor shaft;
   a circuit carrier with a controller for controlling said electric motor;
   a gearbox having an output shaft and a gearbox housing shell, said rotor shaft of said electric motor being disposed axially with respect to said output shaft of said gearbox, and said rotor shaft of said electric motor being accommodated in said output shaft in a rotatably mounted manner in a region of said gearbox housing shell;
   said circuit carrier disposed between said electric motor and said output shaft of said gearbox, said circuit carrier having a cutout formed therein and said rotor shaft leading through said cutout in said circuit carrier; and
   said circuit carrier being equipped with electronic components on both sides, said electronic components including:
      a first sensor for detecting a rotor position, said first sensor being disposed outside said cutout on a side of said circuit carrier facing said electric motor, and
      a second sensor for detecting an angle of said output shaft, said second sensor being disposed outside said cutout on a side of said circuit carrier facing said output shaft.

2. The structural concept according to claim 1, wherein said first sensor is a magnetoresistive sensor or as a switched Hall sensor array.

3. The structural concept according to claim 1, wherein said second sensor is a linear Hall sensor, a single-switched Hall sensor or a switched Hall sensor array.

4. The structural concept according to claim 1, further comprising a seal disposed between said motor housing shell and said gearbox housing shell.

5. The structural concept according to claim 4, wherein said seal is a liquid seal or a solid seal or is injection-molded onto one of said motor housing shell or said gearbox housing shell.

6. The structural concept according to claim 1, wherein that a radial extension of said motor housing shell corresponds substantially to a radial extension of said electric motor.

7. The structural concept according to claim 1, wherein a total axial extension of the structural concept corresponds substantially to a sum of an axial extension of said motor housing shell and an axial extension of said gearbox housing shell.

8. The structural concept according to claim 1, wherein the actuator is configured as a parking lock, as an automatic transmission selector switch, as a gear selector or as a clutch actuator in the motor vehicle.

9. The structural concept according to claim 1, wherein said output shaft has a bearing, said rotor shaft is mounted rotatably in said output shaft, it being possible for said bearing in said output shaft to be a sliding bearing or a rolling body bearing.

* * * * *